(12) United States Patent
Amend

(10) Patent No.: US 12,513,091 B2
(45) Date of Patent: Dec. 30, 2025

(54) MULTIPATH RECEIVER AND PROCESSING OF 3GPP ATSSS ON A MULTIPATH RECEIVER

(71) Applicant: Deutsche Telekom AG, Bonn (DE)

(72) Inventor: Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/847,708

(22) PCT Filed: Mar. 22, 2023

(86) PCT No.: PCT/EP2023/057315
§ 371 (c)(1),
(2) Date: Sep. 17, 2024

(87) PCT Pub. No.: WO2023/186654
PCT Pub. Date: Oct. 5, 2023

(65) Prior Publication Data
US 2025/0112870 A1   Apr. 3, 2025

(30) Foreign Application Priority Data
Mar. 28, 2022   (EP) ..................................... 22164718

(51) Int. Cl.
*H04L 47/52*      (2022.01)
*H04J 1/16*       (2006.01)
(Continued)

(52) U.S. Cl.
CPC ............ *H04L 47/62* (2013.01); *H04L 47/521* (2013.01); *H04L 65/1069* (2013.01)

(58) Field of Classification Search
CPC ....... H04L 47/34; H04L 1/1887; H04L 47/50; H04L 43/0829; H04L 65/60;
(Continued)

(56) References Cited

U.S. PATENT DOCUMENTS

2006/0062223 A1* 3/2006 Manuel .................. H04W 8/04
                                                      370/392
2013/0003864 A1  1/2013 Sullivan
                       (Continued)

FOREIGN PATENT DOCUMENTS

CN      103621085 A    3/2014
EP        3522479 A1   8/2019
                       (Continued)

OTHER PUBLICATIONS

Deutsche Telekom AG et al: "New Solution: MP-DCCP-LL based ATSSS steering functionality for Non-TCP traffic", 3GPP Draft; S2-2200983, 3rd Generation Partnership Project (3GPP), Mobile Competence Centre; 650, Route Des Lucioles; F-06921 Sophia-Antipolis Cedex; France, vol. SA WG2, No. Elbonia; Feb. 14-Feb. 25, 2022, Jan. 28, 2022 (Jan. 28, 2022), pp. 1-14, XP052125174, Retrieved from the Internet: URL:https://ftp.3gpp.org/tsg sa/WG2 Arch/TSGS2 149E Electronic 2022-02/Docs/S2-2200983.zip S2-2200983_MPDCCP4ATSSS.doc [retrieved on Jan. 28, 2022].
(Continued)

*Primary Examiner* — Marcus Smith
*Assistant Examiner* — Jason A Harley
(74) *Attorney, Agent, or Firm* — LEYDIG, VOIT & MAYER, LTD.

(57) ABSTRACT

A multipath receiver includes: a reorder queue configured to queue data packets received over multiple paths; and a reorder queue controller configured to reorder the data packets in the reorder queue according to a reorder criterion. The reorder queue controller is configured to allow Multi-Access Protocol Data Unit (MA PDU) Sessions based on Access Traffic Steering, Switching, and Splitting (ATSSS). The reorder queue controller is configured to choose to activate a reordering of the data packets. The reorder queue controller is configured to negotiate the activation of the
(Continued)

reordering of the data packets with peers of an MA PDU Session based on an ATSSS use case, wherein in case reordering is activated, the data packets are queued in a reorder queue. The reorder criterion is based on a sequence numbering of the data packets of the MA PDU Session based on the ATSSS use case.

20 Claims, 1 Drawing Sheet

(51) Int. Cl.
   *H04L 5/00* (2006.01)
   *H04L 47/62* (2022.01)
   *H04L 65/1069* (2022.01)
   *H04W 4/029* (2018.01)
   *H04W 72/12* (2023.01)
   *H04W 72/1268* (2023.01)

(58) Field of Classification Search
   CPC ............ H04L 43/0835; H04L 47/125; H04W 52/242; H04W 28/065
   USPC ................. 370/444, 235, 389; 455/435.3
   See application file for complete search history.

(56) References Cited

U.S. PATENT DOCUMENTS

| | | | | |
|---|---|---|---|---|
| 2014/0108496 | A1* | 4/2014 | Heller | G06F 16/954 709/203 |
| 2017/0013065 | A1* | 1/2017 | Ho | H04L 1/1858 |
| 2019/0149266 | A1* | 5/2019 | Dikarev | H04B 7/0486 370/329 |
| 2019/0357294 | A1* | 11/2019 | Ha | H04W 76/15 |
| 2020/0403928 | A1* | 12/2020 | Amend | H04L 49/90 |
| 2021/0014734 | A1* | 1/2021 | Liu | H04W 28/0942 |
| 2021/0400537 | A1 | 12/2021 | Zhang et al. | |
| 2023/0023893 | A1* | 1/2023 | Venkataraman | H04W 28/0273 |
| 2023/0319634 | A1* | 10/2023 | Youn | H04W 80/10 370/229 |

FOREIGN PATENT DOCUMENTS

| | | |
|---|---|---|
| EP | 3531637 B1 | 1/2020 |
| WO | WO 0203725 A1 | 1/2002 |
| WO | WO 2021183045 A1 | 9/2021 |

OTHER PUBLICATIONS

Amend D Von Hugo DT M: "Multipath sequence maintenance draftamend-iccrg-multipath-reordering-03; draft-amend-iccrg-multipathreordering-03.txt", Multipath Sequence Maintenance Draft-Amend-ICCRG-Multipath-Reordering-03; Draft-Amend-ICCRG-Multipathreordering-03.TXT; Internet-Draft: ICCRG Working Group, Internet Engineering Task Force, IETF; STA No. 3, Oct. 25, 2021 (Oct. 25, 2021), pp. 1-16, XP015148517, Retrieved from the Internet: URL:https://tools.ietf.org/html/draft-amend-iccrg-multipath-reordering-03 [retrieved on Oct. 25, 2021].

Amend M. et al: "DCCP Extensions for Multipath Operation with Multiple Addresses draft-ietf-tsvwg-multipath-dccp-04; draft-ietf-tsvwg-multipath-dccp-04.txt", DCCP Extensions for Multipath Operation With Multiple Addresses Draft-IETF-TSVWG-Multipath-DCCP-04; Draft-IETF-TSVWG-Multipath-DCCP-04.TXT; Internet-Draft: Transport Area Working Group, Internet Engin No. 4, Mar. 7, 2022 (Mar. 7, 2022), pp. 1-36, XP015150868, Retrieved from the Internet: URL https://tools.ietf.org/html/draft-ietf-tsvwg-multipath-dccp-04 [retrieved on Mar. 7, 2022].

* cited by examiner

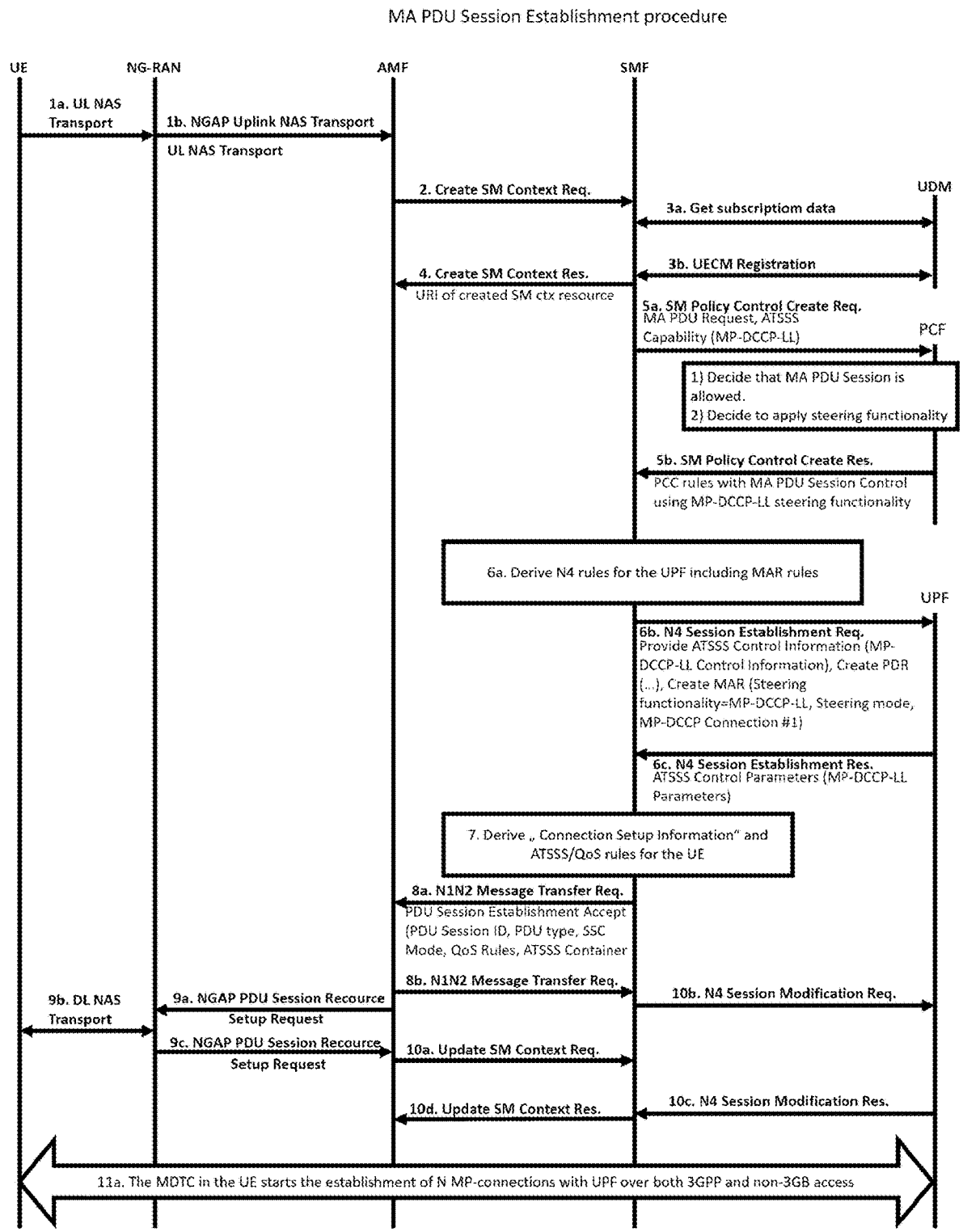

MULTIPATH RECEIVER AND PROCESSING OF 3GPP ATSSS ON A MULTIPATH RECEIVER

CROSS-REFERENCE TO PRIOR APPLICATIONS

This application is a U.S. National Phase application under 35 U.S.C. § 371 of International Application No. PCT/EP2023/057315, filed on Mar. 22, 2023, and claims benefit to European Patent Application No. EP 22164718.3, filed on Mar. 28, 2022. The International Application was published in English on Oct. 5, 2023 as WO 2023/186654 A1 under PCT Article 21(2).

TECHNICAL FIELD

The invention relates to a multipath receiver which comprises a reorder queue device configured to queue data packets received over multiple paths and comprises a reorder queue controller configured to reorder the data packets in the reorder queue according to a reorder criterion. The invention further relates to a method for processing data packets received by a multipath receiver.

BACKGROUND

The present disclosure relates to the context of receiving of 3GPP and non-3GPP data packets by a user equipment (UE) or residential gateway (RG) distributed across multiple paths of a multipath channel. The architectural framework, the terminology, definitions and references used in this application refer to the technical report TR-23.700-53 "Study on access traffic steering, switching and splitting support in the 5G system architecture" and other standards developed within the scope of the 3GPP. All the terms, definitions and abbreviations used in these standards and technical specifications are adopted by this application.

As of Rel. 16, access traffic steering-switching-splitting (ATSSS or AT3S) is defined as part of the system architecture for the 5G System (5GS) specification TS 23.501 to combine 3GPP and non-3GPP access between an UE/RG and a 5G Core. A major ATSSS enhancement, proposed in the scope of the Rel. 18 technical report TR-23.700-53, includes the new steering functionalities in addition to the existing ATSSS lower layer (ATSSS-LL) and multipath transmission control protocol (MPTCP) steering functionalities defined in TS 23.501, which can be used to support steering, switching and splitting of non-TCP traffic flows, e.g. User Datagram Protocol (UDP) traffic flows and Internet Protocol (IP) traffic flows.

Depending on the negotiated features during a multi-access protocol data unit (MA PDU) session establishment and the exchange of ATSSS rules it can be selected whether to apply Steering, Switching or Splitting, the steering function, e.g. ATSSS-LL or MPTCP, the steering mode e.g. Priority-Based or Load Balancing and the scope. The latter is using ATSS specific UE Route Selection Policies (URSP) and ATSSS rules to apply ATSSS settings for any traffic or for particular traffic, based e.g. on AppID, IP address, etc.

While those settings until now determine the sender behavior in terms of traffic treatment, the receiver side is not reflected. With the upcoming discussion in the Rel. 18 of TR-23.700-53 study phase to support traffic splitting for non-TCP traffic, the receiving side moves into the focus. Presently, traffic splitting of non-TCP traffic flows is not fully supported with the ATSSS-LL, because this steering functionality may introduce out of order delivery, which can severely impact the transport performance.

Compared to ATSSS-LL which does not support traffic splitting at all and the MPTCP which inherits TCP re-ordering principles, the demands on non-TCP traffic splitting are different in respect to re-assemble data streams on receiver side. It is expected that a receiver side handling of split traffic is required in certain scenarios to compensate for the different path propagations, which causes out-of-order arrival.

Applying the strict in-order delivery known from MPTCP is most likely not useful in case the UDP traffic is distributed across multiple paths. When several paths are utilized concurrently to transmit user data between a sender and the receiver, different characteristics of the paths in terms of bandwidth, delay, or error proneness can impact the overall performance due to delayed packet arrival and/or lost packets. As soon as packet loss occurs, this would lead to an immediate stall in the receiver reordering process, because UDP has no way to re-transmit lost packets. Packet loss detection becomes important when multipath protocols are applied which do not guarantee successful transmission, as TCP achieves by acknowledgement of successful reception. For example, multi-path-data congestion control protocol (MP-DCCP) or multipath extension over quick UDP Internet connections (MP-QUIC) with DATAGRAM extension are unreliable protocols in that sense.

It is therefore beneficial to provide more relaxed reordering modes beyond the strict in-order delivery and provide this as part of the ATSSS framework.

As defined in Section 5.1 of TR-23.700-53, 3GPP searches for a solution to split non-TCP traffic across multiple paths. Any solution discussed in the corresponding solution space will suffer from different access characteristics provided from the combination of a 3GPP access, e.g. cellular, and a non-3GPP access, e.g. Wi-Fi. A split data stream will for example experience different path delays, bandwidths and packet loss rates, which cause an out-of-order delivery at the multipath receiver, e.g. a UE, a RG, a AT3S user plane function (UPF) or a service endpoint. Services which are sensitive to this out-of-order deliver will potentially react with a degraded quality of service (QOS), e.g. the service is interrupted or the data transport is adjusted to lower data rates.

SUMMARY

In an exemplary embodiment, the present invention provides a multipath receiver. The multipath receiver includes: a reorder queue configured to queue data packets received over multiple paths; and a reorder queue controller configured to reorder the data packets in the reorder queue according to a reorder criterion. The reorder queue controller is configured to allow Multi-Access Protocol Data Unit (MA PDU) Sessions based on Access Traffic Steering, Switching, and Splitting (ATSSS). The reorder queue controller is configured to choose to activate a reordering of the data packets. The reorder queue controller is configured to negotiate the activation of the reordering of the data packets with peers of an MA PDU Session based on an ATSSS use case, wherein in case reordering is activated, the data packets are queued in a reorder queue. The reorder criterion is based on a sequence numbering of the data packets of the MA PDU Session based on the ATSSS use case.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 1 is a flowchart showing an MA PDU session establishment procedure.

DETAILED DESCRIPTION

Exemplary embodiments of the present invention provide a solution for the above-mentioned problem in the background, i.e. to define reordering modes for the ATSSS use cases, a negotiation procedure for applying these reordering modes, and interactions with the steering modes.

Therefore the present invention defines a multipath receiver, a method to deal with data packets received by a multipath receiver, and a computer readable non transitory medium on which computer instructions are stored.

The devices and methods presented below may be of various types. The individual elements and features may be realized by hardware and/or software components. A multipath according to this application comprises at least 2 paths for data packet transport.

In an embodiment, the invention provides a multipath receiver, wherein a reorder queue controller is configured to allow MA PDU Sessions based on ATSSS, in other words wherein the reorder queue controller is capable to operate on MA PDU sessions based on ATSSS and wherein the reorder criterion is based on a sequence numbering of the data packets of the MA PDU Session based on ATSSS.

One feature which unites all reordering modes is the non-strict application of data ordering. The basic concept behind the reordering is the restoration of the data stream order close to the order of generation on sender side. The challenge to overcome is the handling of packet loss in the reordering process and the decision how long to wait for missing data. Using a sequence number as a reorder criterion for data packets received during an MA PDU Session based on ATSSS is a feature for the reordering in connection with ATSSS use cases in accordance with embodiments of the invention.

In an embodiment, a method comprises the receiving of data packets of a MA PDU Session based on ATSSS over multiple paths, wherein a reorder queue controller of the multipath receiver chooses to activate reordering of the received data packets, wherein in case reordering is activated, the data packets are queued in a reorder queue and the data packets are reordered in the reorder queue according to a reorder criterion, wherein the reorder criterion is based on a sequence numbering of the data packets.

In a preferred embodiment the multipath receiver, in particular the reorder queue controller, is configured to choose to activate a reordering of the data packets. Thus the multipath receiver, in particular the reorder queue controller of the multipath receiver is able to activate the reordering or not. Deactivation of the reordering may be chosen if the reordering is currently activated. In an embodiment of this configuration, the multipath receiver is configured to negotiate the activation of the reordering of the data packets with the peers of the MA PDU Session based on ATSSS, in other words with the peer of the multipath receiver. This negotiation allows the multipath receiver to reach an agreement whether a reordering is suitable for the current use case or not. Preferably this negotiation takes place during the MA PDU session establishment as part of the negotiation of ATSSS and N4 rules.

In another preferred embodiment, the reorder queue controller is configured to detect a packet loss of the data packets based on the comparison of at least two sequence numbers of the received data packets, and in case of a detected packet loss the reorder queue controller is configured to choose a reordering mode for the received data packets, in particular to negotiate the reordering mode with the peers of the MA PDU Session based on ATSSS, in other words with the peer of the multipath receiver. This negotiation allows the multipath receiver to reach an agreement on the best reordering mode for the current use case. Preferably this negotiation also takes place during the MA PDU session establishment as part of the negotiation of ATSSS and N4 rules.

Basic information of the MA PDU session establishment as shown in the flow diagram in TR-23.700-53, section 6.3.3 is depicted in an extract in FIG. 1 of this application. The aforementioned negotiations of the activation of the reordering and/or of the reordering mode is preferably embedded in points 5a, 5b, 6a, 6b or 6c of the flow diagram.

Preferably, the reordering mode is based on an ATSSS steering function, e.g. ATSSS-LL, MPTCP, MP-DCCP-LL or MP-QUIC, and/or an ATSSS steering mode, e.g. Active Standby, Smallest Delay, Load Balancing or Priority Based.

A reorder mode may be a strict sequence number based reordering. This approach covers all mechanisms which attempt to re-generate the original order of data packets in the flow exactly, independent of the expected or resulting delay due to waiting time for all packets on all paths to arrive. In the given case of unreliable transport protocols, this may result in a large delay due to Head-of-Line blocking and for actual packet loss in a remaining packet gap which causes a stand still without an option to recover. For applications demanding near real-time delivery of packets, it should not be applied.

A preferred reorder criterion for the reordering modes comprises a static expiration timer for a packet loss detection or a dynamic expiration timer for a packet loss detection, wherein the static or dynamic expiration time is preferably based on a path specific characteristic, in particular the latency, of the multiple paths.

The method comprising a static expiration timer to detect and decide on packet loss assumes a certain fixed time threshold for the gap between data packets within a sequence after re-combination of both paths. A possible re-transmission-either in the multipath system internally or based on the piggybacked protocol/service-will possibly not be requested before this threshold is exceeded. Thus an additional delay in the overall latency budget will occur so that this simple approach is only recommended for non-time critical applications. Every packet loss or simultaneous transmission of data over the short and long latency path will cause spikes in the service perceived latency.

In the method comprising a dynamic expiration timer, the packet gap is assumed as packet loss after exceeding a flexibly decided on time threshold which may be derived dynamically from the differences between latencies both paths exhibit. As the latency may vary due to propagation conditions or routing paths, this latency difference has to be monitored and statistically evaluated (smoothed), which introduces additional effort. In an embodiment, a solution for this is the determination of the one way latency or sending available RTT information from the sender from which the multipath receiver can calculate the latency difference.

In another preferred embodiment, the sequence numbering of the data packets is a path-specific numbering, and the reorder criterion is based on the path-specific numbering of the data packets; and/or the sequence numbering of the data packets is an overall numbering across the multiple paths, and the reorder criterion is based on the overall sequence numbering of the data packets across the multiple paths. This embodiment relates to features disclosed in document EP 3 531 637 B1 "Techniques for efficient reordering of data packets in multipath scenarios," which is incorporated by reference herein in its entirety.

Preferably, the multipath receiver, in particular its reorder queue controller, is configured to trigger the aforementioned re-transmission, in particular a partial re-transmission, of a specific data packet after a packet lost detection of the specific data packet.

In an also preferable alternative to the re-transmission, the multipath receiver is configured to recover a specific data packet after a packet lost detection of the specific data packet. A recovering of data packets, in particular of lost data packets or assumed lost data packets on the receiver side avoids re-transmission and potentially mitigates the resequencing process in respect to detecting data packet loss. Shorter latencies will be an expected outcome.

In a preferred embodiment, the multipath receiver comprises a forward error correction (FEC) device, which preferably is applied to one or more of the multiple paths. This approach is based on introduction of redundancy to user data to detect errors and subsequently reconstruct data in case of a limited number of bit or Byte errors. As such, a data packet with corrupted data can be recovered up to a certain degree, but in case of a too high bit error rate, a data packet is completely lost. However, in combination with scrambling, i.e. the sequence of original data stream is distributed over multiple packets and re-compiled afterwards, data from lost data packets may be recovered. As such methods introduce additional delay and overhead, they are mainly applied in case of long re-transmission delays as, e.g., is typical for satellite transmission. FEC can be applied to each path separately, e.g. if they exhibit deviating performance characteristics to not degrade the 'better one' or in an overall FEC fashion before split and recombination which would support scrambling and facilitate recovery of completely lost packets on the 'worse path'. Unsuccessful application of FEC may enable quick detection of unrecoverable errors in a packet and thus trigger re-transmission from the sender side before time-out.

In another preferred embodiment, the reorder queue device is configured to receive data packets transmitted with linear network coding (LNC). LNC network nodes (or interfaces of a device) do not simply relay the packets of information they receive, but combine several packets together for transmission. After reception of combined and separate packets, the maximum possible information flow in a network can be detected, and throughput, efficiency and scalability, as well as resilience to attacks and eavesdropping, can be improved. The method in general improves with the number of paths in excess of two. Drawbacks of LNC are high decoding computational complexity, high transmission overhead, and linear dependency among coefficients vectors for en- and decoding. Triangular network coding (TNC) addresses the high encoding and decoding computational complexity without degrading the throughput performance, with code rate comparable to that of LNC. TNC is therefore advantageous for implementation on small devices as mobile phones and wireless sensors with limited processing capability and power supply.

Preferably, a reordering criterion is exclusive for a specific ATSSS steering function and/or ATSSS specific steering mode. This means when a certain steering function or mode is selected, not any reordering mode and/or feature is available or vice versa. This has the benefit that computational overhead will be reduced if a reordering mode does not bring a benefit or reordering is disadvantageous.

A scenario where reordering leads to computational overhead is when ATSSS is used in steering or switching mode (effectively single-path usage). A worse effect might be caused if an application is robust against out-of-order delivery or has its own optimized re-ordering logic. It is therefore recommended to specify when steering or switching is selected so that re-ordering is switched off.

In an embodiment, the invention may be implemented as an instruction code stored on a computer readable non transitory medium, so that when the code is executed by a computer, the execution causes the computer to perform the method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath receiver, comprising:
   a reorder queue configured to queue data packets received over multiple paths; and
   a reorder queue controller configured to reorder the received data packets in the reorder queue;
   wherein the reorder queue controller is configured to allow Multi-Access Protocol Data Unit (MA PDU) Sessions based on Access Traffic Steering, Switching, and Splitting (ATSSS);
   wherein the reorder queue controller is configured to:
      choose whether or not to activate reordering for the received data packets; and
      based on choosing to activate reordering, choose a reordering mode for reordering the data packets;

wherein queuing of the received data packets in the reorder queue is responsive to choosing to activate the reordering for the received data packets;

wherein choosing whether or not to activate reordering is based on a negotiation with peers of an MA PDU Session based on an ATSSS use case, wherein the negotiation includes the multipath receiver reaching an agreement with the peers of the MA PDU Session as to whether reordering is suitable for the ATSSS use case; and wherein choosing the reordering mode comprises choosing the reordering mode from among a plurality of reordering modes, wherein the plurality of reordering modes include:
  a strict sequence number based reordering mode;
  a sequence number based reordering mode using a static expiration timer for packet loss detection; and
  a sequence number based reordering mode using a dynamic expiration timer for packet loss detection.

2. The multipath receiver according to claim 1, wherein choosing the reordering mode is further in response to the reorder queue controller detecting packet loss based on a comparison of at least two sequence numbers of the received data packets.

3. The multipath receiver according to claim 2, wherein the chosen reordering mode is based on an ATSSS steering function and/or an ATSSS steering mode.

4. The multipath receiver according to claim 1, wherein the sequence numbering of the received data packets is a path-specific numbering.

5. The multipath receiver according to claim 1, wherein the sequence numbering of the received data packets is an overall numbering across the multiple paths.

6. The multipath receiver according to claim 1, wherein the multipath receiver is configured to trigger a re-transmission of a specific data packet after a packet lost detection of the specific data packet.

7. The multipath receiver according to claim 1, wherein the multipath receiver is configured to recover a specific data packet after a packet lost detection of the specific data packet.

8. The multipath receiver according to claim 1, wherein the received data packets were transmitted with linear line coding (LNC).

9. The multipath receiver according to claim 1, wherein the reordering is based on a specific ATSSS steering function and/or ATSSS specific steering mode.

10. The multipath receiver according to claim 1, wherein the multipath receiver comprises a forward error correction (FEC) device.

11. The multipath receiver according to claim 1, wherein a static or dynamic expiration time is based on a path-specific characteristic of the multiple paths.

12. The multipath receiver according to claim 11, wherein the path-specific characteristic corresponds to latency.

13. The multipath receiver according to claim 1, wherein the negotiation takes place during MA PDU session establishment.

14. The multipath receiver according to claim 1, wherein choosing the reordering mode from among the plurality of reordering modes includes:
  choosing the strict sequence number based reordering mode based on a respective application corresponding to the received data packets not having a limited delay requirement.

15. The multipath receiver according to claim 1, wherein choosing the reordering mode from among the plurality of reordering modes includes:
  choosing between the sequence number based reordering mode using the static expiration timer for packet loss and the sequence number based reordering mode using the dynamic expiration timer for packet loss detection based on a path-specific latency characteristic of the multiple paths.

16. The multipath receiver according to claim 15, wherein the sequence number based reordering mode using the static expiration timer for packet loss detection is chosen for a first application, and the sequence number based reordering mode using the dynamic expiration timer for packet loss detection is chosen for a second application, wherein the first application is less time-critical than the second application.

17. The multipath receiver according to claim 1, wherein the sequence number based reordering mode using the dynamic expiration timer for packet loss detection includes dynamically deriving a time threshold based on differences between latencies of a plurality of paths.

18. A method for a multipath receiver, the method comprising:
  receiving, by the multipath receiver, data packets of a Multi-Access Packet Data Unit (MA PDU) Session based on Access Traffic Steering, Switching, and Splitting (ATSSS) over multiple paths;
  choosing, by a reorder queue controller of the multipath receiver, whether or not to activate reordering for the received data packets;
  based on choosing to activate reordering, choosing, by the reorder queue controller, a reordering mode for reordering the received data packets; and
  queuing, by a reorder queue of the multipath receiver, the received data packets in the reorder queue in response to the reorder queue controller of the multipath receiver choosing to activate reordering for the received data packets and according to the chosen reordering mode;
  wherein choosing whether or not to activate reordering is based on a negotiation with peers of an MA PDU Session based on an ATSSS use case, wherein the negotiation includes the multipath receiver reaching an agreement with the peers of the MA PDU Session as to whether reordering is suitable for the ATSSS use case; and
  wherein choosing the reordering mode comprises choosing the reordering mode from among a plurality of reordering modes, wherein the plurality of reordering modes include:
    a strict sequence number based reordering mode;
    a sequence number based reordering mode using a static expiration timer for packet loss detection; and
    a sequence number based reordering mode using a dynamic expiration timer for packet loss detection.

19. The method according to claim 18, wherein choosing the reordering mode is further in response to the reorder queue controller detecting packet loss based on a comparison of at least two sequence numbers of the received data packets.

20. A non-transitory computer-readable medium having processor-executable instructions stored thereon, wherein the processor-executable instructions, when executed, facilitate performance of the following:
  receiving, by a multipath receiver, data packets of a Multi-Access Packet Data Unit (MA PDU) Session based on Access Traffic Steering, Switching, and Splitting (ATSSS) over multiple paths;

choosing, by a reorder queue controller of the multipath receiver, whether or not to activate reordering for the received data packets;

based on choosing to activate reordering, choosing, by the reorder queue controller, a reordering mode for reordering the received data packets; and queuing, by a reorder queue of the multipath receiver, the received data packets in the reorder queue in response to the reorder queue controller of the multipath receiver choosing to activate reordering for the received data packets and according to the chosen reordering mode;

wherein choosing whether or not to activate reordering is based on a negotiation with peers of an MA PDU Session based on an ATSSS use case, wherein the negotiation includes the multipath receiver reaching an agreement with the peers of the MA PDU Session as to whether reordering is suitable for the ATSSS use case; and wherein choosing the reordering mode comprises choosing the reordering mode from among a plurality of reordering modes, wherein the plurality of reordering modes include:
 a strict sequence number based reordering mode;
 a sequence number based reordering mode using a static expiration timer for packet loss detection; and
 a sequence number based reordering mode using a dynamic expiration timer for packet loss detection.

\* \* \* \* \*